(12) United States Patent
Casimere et al.

(10) Patent No.: US 9,880,775 B2
(45) Date of Patent: *Jan. 30, 2018

(54) SYSTEM AND APPARATUS FOR TRANSFERRING DATA BETWEEN COMMUNICATION ELEMENTS

(71) Applicant: AT&T Intellectual Property I, LP, Atlanta, GA (US)

(72) Inventors: Kelley Casimere, Orinda, CA (US); Gail A. Churillo, Fremont, CA (US); Susanne M. Crockett, Ingleside, IL (US); Liaqat Ali, Danville, CA (US); Patricia M. Thatcher, Chico, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,551

(22) Filed: Dec. 11, 2014

(65) Prior Publication Data

US 2015/0095529 A1 Apr. 2, 2015

Related U.S. Application Data

(63) Continuation of application No. 13/903,429, filed on May 28, 2013, now Pat. No. 8,935,803, which is a (Continued)

(51) Int. Cl.
*H04L 29/00* (2006.01)
*G06F 3/06* (2006.01)
(Continued)

(52) U.S. Cl.
CPC ............ *G06F 3/0647* (2013.01); *G06F 3/067* (2013.01); *G06F 3/0608* (2013.01); (Continued)

(58) Field of Classification Search
CPC ...... G06F 3/0647; G06F 3/0608; G06F 3/067; G06F 21/6218
See application file for complete search history.

(56) References Cited

U.S. PATENT DOCUMENTS 6,868,282 B2* 3/2005 Carlsson ............... H04W 60/00
455/41.2
6,963,908 B1* 11/2005 Lynch .................. G06F 9/44505
709/220

(Continued)

OTHER PUBLICATIONS

Jaytech"Jaytech SIM Card Data Protector", withandwithoutwires.com, Apr. 13, 2007, 1-6.
tigerdirect.ca, "Power-Up LCD SIM Card Reader GEN-5002 in Canada at TigerDirect.ca", Apr. 13, 2007, 1-6.

*Primary Examiner* — Jeffrey Pwu
*Assistant Examiner* — Helai Salehi
(74) *Attorney, Agent, or Firm* — Guntin & Gust, PLC; Antanu Das

(57) ABSTRACT

A method, device and machine-readable storage device for transferring data between identity modules is disclosed. Data is stored in one of a first removable storage module coupled to a donor communication device and a memory of the donor communication device, or both. A first portion of the data is provided to a server. The server provides the first portion of the data to a second removable storage module coupled to a recipient communication device responsive to a determination that a recipient communication device has a right to the data. Additional embodiments are disclosed.

20 Claims, 3 Drawing Sheets

Related U.S. Application Data continuation of application No. 11/735,327, filed on Apr. 13, 2007, now Pat. No. 8,474,050.

(51) Int. Cl.
  *H04L 29/06* (2006.01)
  *G06F 21/60* (2013.01)
  *G06F 21/62* (2013.01)

(52) U.S. Cl.
  CPC ........ *G06F 21/606* (2013.01); *G06F 21/6218* (2013.01); *H04L 63/0281* (2013.01); *H04L 63/166* (2013.01)

(56) References Cited

U.S. PATENT DOCUMENTS

| | | | |
|---|---|---|---|
| 2002/0177410 A1* | 11/2002 | Klein | H04M 1/274516 455/41.1 |
| 2004/0180657 A1* | 9/2004 | Yaqub | H04L 63/0853 455/435.1 |
| 2005/0080884 A1 | 4/2005 | Siorpaes | |
| 2005/0279826 A1 | 12/2005 | Merrien | |
| 2006/0080259 A1* | 4/2006 | Wajs | G06F 21/10 705/51 |
| 2006/0111147 A1 | 5/2006 | Lan | |
| 2006/0223582 A1* | 10/2006 | Simola | H04M 1/274516 455/558 |
| 2007/0172065 A1* | 7/2007 | Lee | G06F 21/10 380/259 |

* cited by examiner

300

SYSTEM AND APPARATUS FOR TRANSFERRING DATA BETWEEN COMMUNICATION ELEMENTS

CROSS-REFERENCE TO RELATED APPLICATIONS

This application is a continuation of and claims priority to U.S. patent application Ser. No. 13/903,429, filed May 28, 2013, which is a continuation of U.S. patent application Ser. No. 11/735,327, filed Apr. 13, 2007, (now U.S. Pat. No. 8,474,050), each of which is incorporated herein by reference in their entirety.

FIELD OF THE DISCLOSURE

The present disclosure relates generally to communication systems, and more specifically to a system and apparatus for transferring data between communication elements.

BACKGROUND

Mobile phones can come equipped with a smart card, such as removable subscriber identity module (SIM) cards or removable user identification module (RUIM) cards that store personalized data, including contact information. Purchase of a new mobile phone can include a new smartcard, which is typically an upgraded smartcard with improved performance in connection with the provider's network. However, the new smartcard does not contain the users personalized data.

To transfer the personalized data, a user must go through a time-consuming process of removing and inserting the old and new smartcards into the old and new phones. Typically, the user must move the old smartcard to the new phone, and save the data from the old smartcard to the new phone. The user then puts the old smartcard back in the old phone, and saves the old phone data to the old smartcard. The user again then moves the old smartcard to the new phone, and saves this data from the old smartcard to the new phone. The new smartcard is then inserted into the new phone and the old smartcard is moved back to the old phone. Activation and deactivation of the new and old smartcards can then occur. In addition to the inefficiencies of the process, a potential risk of loss of data exists, as well as the potential risk of damage during handling of the smartcards.

A need therefore arises for a system and apparatus for transferring data between communication elements.

DETAILED DESCRIPTION

Embodiments in accordance with the present disclosure provide a system and apparatus for transferring data between communication elements.

In a first embodiment of the present disclosure, a computer-readable storage medium in a web server of a telephony service provider can have computer instructions for receiving a request to transfer data stored in at least one among a first subscriber identity module (SIM) card and a first communication device to at least one among a second SIM card and a second communication device, establishing a secure communication link between the web server and each of the first and second communication devices, retrieving the data stored in at least the first SIM card and the first communication device, and transferring the data to at least one among the second SIM card and the second communication device responsive to verifying that a recipient of the data has rightful possession of at least a portion of the data.

In a second embodiment of the present disclosure, a communication device can have a controller element to receive data from a web server to update one or more entries of an identity module coupled to the controller element. The data can be retrieved by the web server from a second communication device.

In a third embodiment of the present disclosure, an identity module can have a memory updateable by a web server by way of a second communication device. The update comprises one or more entries retrieved by the web server from at least one among a first identity module and a first communication device.

Figure 1:
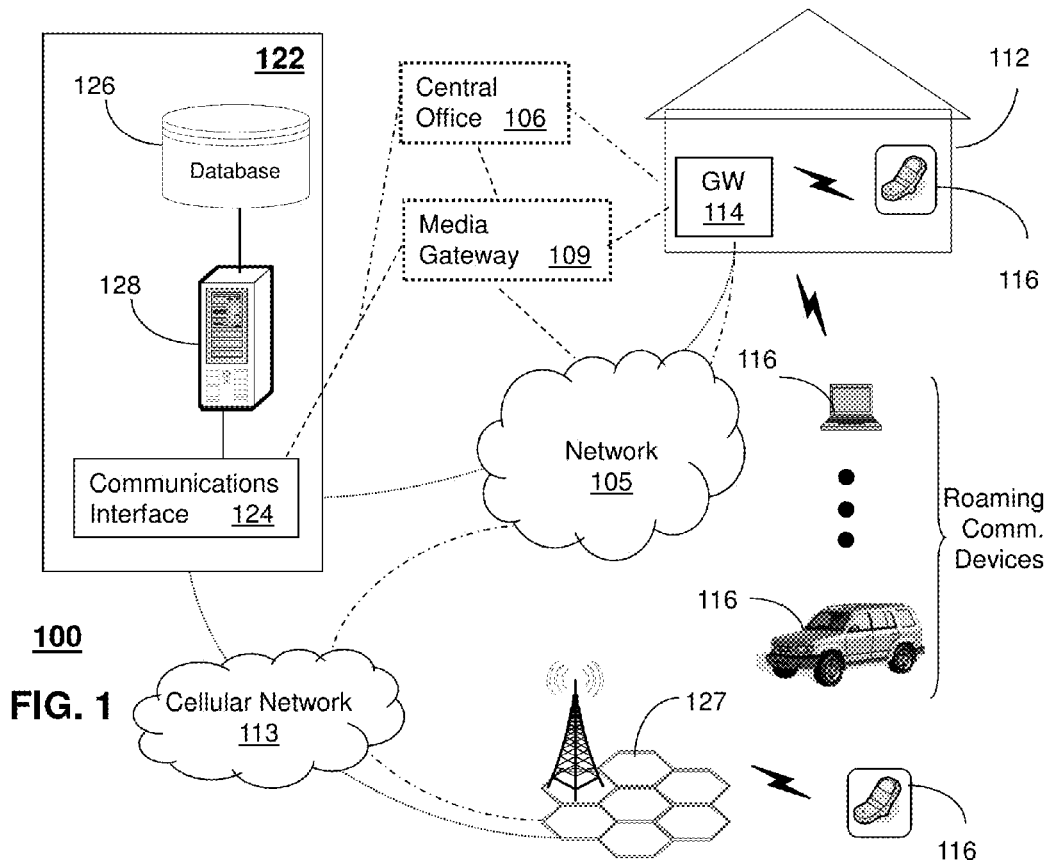
FIG. 1 depicts an exemplary embodiment of a communication system.

FIG. 1 depicts an exemplary embodiment of a mobile communication device 116 communicating by way of wireless access points (WAPs) with other communication devices and/or a network proxy or web server 122 which collectively operate in a communication system 100. The communication device 116 can be a multimode VoIP terminal. However, the present disclosure contemplates the use of other types of communication devices, including other types of voice, video and data devices such as personal digital assistants (PDAs) such as a Blackberry™, and a PocketPC™—just to mention a few. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1×, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
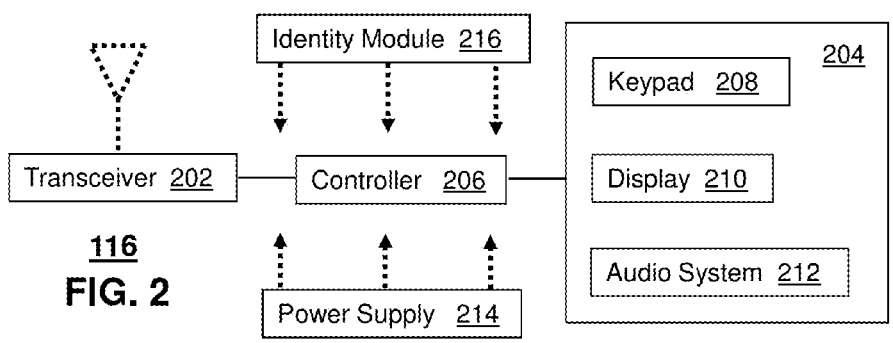
FIG. 2 depicts an exemplary block diagram of one of several embodiments for a communication device operating in the communication system.

FIG. 2 depicts an exemplary embodiment of the wireless communication device 116. The communication device 116 can comprise a wireless transceiver 202, a user interface (UI) 204, a power supply 214, and a controller 206 for managing operations thereof. The transceiver 202 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1×, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

The UI 204 can include a keypad 208 with depressible or touch sensitive navigation disk and keys for manipulating operations of the communication device 116. The UI 204 can further include a display 210 such as monochrome or color LCD (Liquid Crystal Display) for conveying images to the end user of the communication device 116, and an audio system 212 that utilizes common audio technology for conveying and intercepting audible signals of the end user.

The power supply 214 can utilize common power management technologies such as replaceable batteries, supply regulation technologies, and charging system technologies for supplying energy to the components of the communication device 116 and to facilitate portable applications. In stationary applications, the power supply 214 can be modified so as to extract energy from a common wall outlet and thereby supply DC power to the components of the communication device 116. The controller 206 can utilize computing technologies such as a microprocessor and/or digital signal processor (DSP) with associated storage memory such a Flash, ROM, RAM, SRAM, DRAM or other like technologies for controlling operations of the aforementioned components of the communication device 116. The memory of the controller 206 can have personalized data stored therein including contact book entries, calendar entries, still pictures, ring tones, wallpapers, music, video recordings, movies and games.

The communication device 116 can also comprise an identity module 216. In one embodiment, the identity module 216 can be removably connectable to the communication device 116 to provide for selective coupling with the controller 206 of the communication device. The identity module 216 can have a memory for storage of various data including an international circuit card identification (IC-CID), international mobile subscriber identity (IMSI), an authentication key (Ki), a local area identity (LAI), a short message service center (SMSC) number, service provider name (SPN), service dialing numbers (SDN), and value added service (VAS) applications. The data can also be personalized data including contact book entries, calendar entries, still pictures (e.g., JPEG or GIF files), ring tones (e.g., MIDI files), wallpapers, audio (e.g., MP3 files), video recordings (e.g., captured by a camera coupled with the communication device 116), movies (e.g., MP4 or WAV files), and games.

In one embodiment, the identity module 216 can be a subscriber identity module (SIM) card, a universal subscriber identity module (USIM) card or a removable user identification module (RUIM) card. In another embodiment, the identity module 216 can be a Willcom-SIM (W-SIM) card having one or more core components of the mobile communication device 116 therein, such as a W-SIM card for a cellular telephone with the radio receiver and transmitter built in the card.

Figure 3:
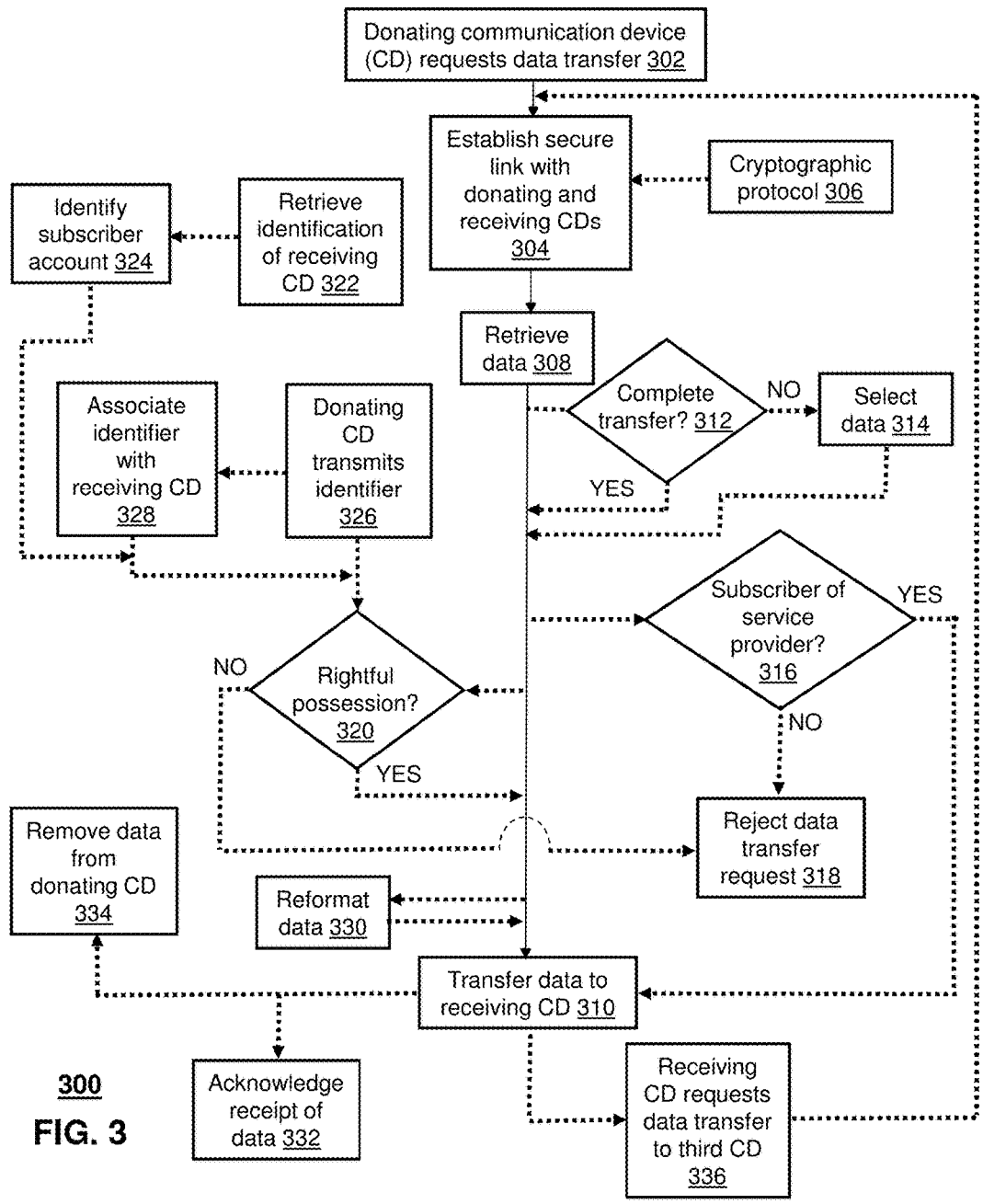
FIG. 3 depicts an exemplary method operating in portions of the communication system.

FIG. 3 depicts an exemplary method 300 operating in portions of the communication system 100. Method 300 has variants as depicted by the dashed lines. It would be apparent to an artisan with ordinary skill in the art that other embodiments not depicted in FIG. 3 are possible without departing from the scope of the claims described below.

Method 300 begins with step 302 where a donating communication device 116 transmits a data transfer request to the network proxy 122. In step 304, the network proxy 122 can establish a secure communication link with the donating communication device 116 and with the intended recipient of the data, e.g., another communication device. The present disclosure also contemplates initially establishing a secure communication link with the donating communication device 116 and subsequently establishing a secure communication link with a receiving communication device, such as where the receiving communication device is temporarily unavailable. The secure communication link can be established by various means, such as through use of cryptographic protocol (e.g., TLS or SSL), as in step 306.

In one embodiment, the donating communication device 116 and the intended recipient of the data can be the same communication device but with different identity modules 216, such as where a user is keeping the same cellular phone but upgrading to a new identity module, and desires to transfer data to the new module. In such an embodiment, a single secure communication link can be established by the network proxy 122 with the communication device 116, and the donating and receiving identity modules 216 can be switched out in accordance with the upload and subsequent download of the data. The downloaded data is not limited to storage in the receiving identity module but can be stored in either or both of the memory of the controller 206 of the receiving communication device 116 and the memory of the identity module 216 of the receiving device.

Once the secure communication link has been established, the network proxy 122 can retrieve the data from the donating communication device 116, as in step 308. The data can be retrieved from the controller 206 of the donating communication device 116 and/or the identity module 216 of the donating device. In one embodiment, the donating communication device 116 can upload data to the network proxy 122 from both of its controller 206 and identity module 216. In step 310, the network proxy 122 can transfer the data to the receiving communication device 116.

The transfer of data can be a complete or partial transfer, as in step 312. In one embodiment, the user of the donating communication device 116 can select whether to upload to the network proxy 122 all of the data from the controller 206 and/or identity module 216 of the donating device or to upload only portions thereof. In another embodiment, the user of the receiving communication device can select whether to download from the network proxy 122 all of the data from the controller 206 and/or identity module 216 of the donating device 116 or to download only portions thereof. In yet another embodiment, network proxy 122 can provide for the user of the donating communication device 116 to designate transferable data, and further provide for the user of the receiving communication device to select from the designated transferable data. The present disclosure contemplates the user of the donating and receiving communication devices 116 being the same or different users. If a partial upload and/or download is chosen, then in step 314 the data to be transferred can be selected, such as through scrolling down and highlighting from a list of transferable data displayed on one or both of the donating and receiving communication devices 116. The present disclosure contemplates other data management techniques being utilized, such as merging and overwriting functions that can be selected by the user.

In one embodiment, prior to download of the data to the receiving communication device 116, the network proxy 122 can determine whether the intended recipient of the data is a subscriber of the service provider, as in step 316. If the intended recipient is a subscriber, then the data can be transferred as recited back in step 310. If on the other hand, the intended recipient is not a subscriber, then the data transfer request can be rejected by the network proxy 122 as in step 318.

In another embodiment, the network proxy 122 can determine whether the intended recipient of the data has a right to possess some or all of the data that is to be transferred, as in step 320. The determination of rightful possession can be made based upon a number of factors, including the intended recipient being a subscriber to the service provider as recited in step 316, as well as other factors, such as the terms of the service plan purchased from the provider. If the intended recipient has a right to possess some or all of the data that is to be transferred, then the data can be transferred as recited back in step 310. If on the other hand, the intended recipient does not have such a right, then the data transfer request can be rejected by the network proxy 122, as recited back in step 318.

In one embodiment, the network proxy 122 can retrieve or otherwise receive identification information of the intended recipient of the data, as in step 322. Based at least in part on the identification information of the intended recipient, in step 324, the network proxy 122 can identify a subscriber account for the intended recipient. The subscriber account can then be used at least in part to verify rightful possession by the intended recipient of the data, as recited back in step 320.

In one embodiment, the donating communication device 116 can transmit an identifier to the network proxy 122, as in step 326. The identifier can then be used at least in part to verify rightful possession by the intended recipient of the data, as recited back in step 320. In another embodiment, the network proxy 122 can verify rightful possession based upon identification information for both the donating communication device 116 and the receiving communication device, such as through a combination of steps 322-326 described above. In yet another embodiment, the network proxy 122 in step 328 can verify rightful possession by associating the donating and receiving communication devices 116, such as by associating the identifier of the donating communication device with the receiving communication device.

In one embodiment, the network proxy 122 can reformat the uploaded data, as in step 330, such as where a communication device 116 and/or identity module 216 has been upgraded, and is operating with a new format of data. In another embodiment, after the transfer of data is completed in step 310, the receiving communication device 116 can transmit an acknowledgement of receipt and successful download of the data, as in step 332. In yet another embodiment, after the transfer of data is completed in step 310, the network proxy 122 can implement the removal of the data from the donating communication device 116 and/or the identity module 216 of the donating device. In another embodiment, after the transfer of data is completed in step 310, the donating communication device 116 and/or the identity module 216 of the donating device can be disabled to prevent further use.

The disablement of the donating communication device 116 and/or the identity module 216 of the donating device can be done after the network proxy 122 receives acknowledgement of receipt and successful download of the data, such as through an instruction transmitted from the network proxy. Where the data transfer has occurred between different identity modules 216 of the same communication device 116, the donating identity module alone can be disabled, such as through an instruction from the network proxy 122. In one embodiment, after the transfer of data is completed in step 310, the receiving communication device 116 can request a data transfer to another or third communication device, as in step 336, which can begin the data transfer process all over again.

The embodiments of method 300 provide a convenient way for end user to transfer data identity modules, communication devices and combinations thereof. The data transferred can be contact book data, calendar data, and media files such as JPEGs, GIFs, MPEG3, MPEG4, MIDI ringtones, software applications, and so on. Any form of transferable data can be applied to the present disclosure.

From the foregoing descriptions, it would be evident to an artisan with ordinary skill in the art that the aforementioned embodiments can be modified, reduced, or enhanced without departing from the scope and spirit of the claims described below. For example, the donating communication device 116 can upload its data for transfer to multiple receiving communication devices. Similarly, multiple donating communication devices 116 can collectively upload their data for transfer to one or more receiving communication devices. The present disclosure contemplates transfer of data from various combinations of communication devices 116 and identity modules 216 through use of uploading and downloading of the data by network proxy 122. For example, a user can transfer data from a donating communication device to a different receiving communication device that can use the same identity module 216 or a different identity module. The network proxy 122 can retrieve and transfer other types of data for other types of components of the communication device 116, such as GPS data where the communication device has a location determination component. These are but a few examples of the modifications that can be applied to the present disclosure without departing from the scope of the claims. Accordingly, the reader is directed to the claims for a fuller understanding of the breadth and scope of the present disclosure.

Figure 4:
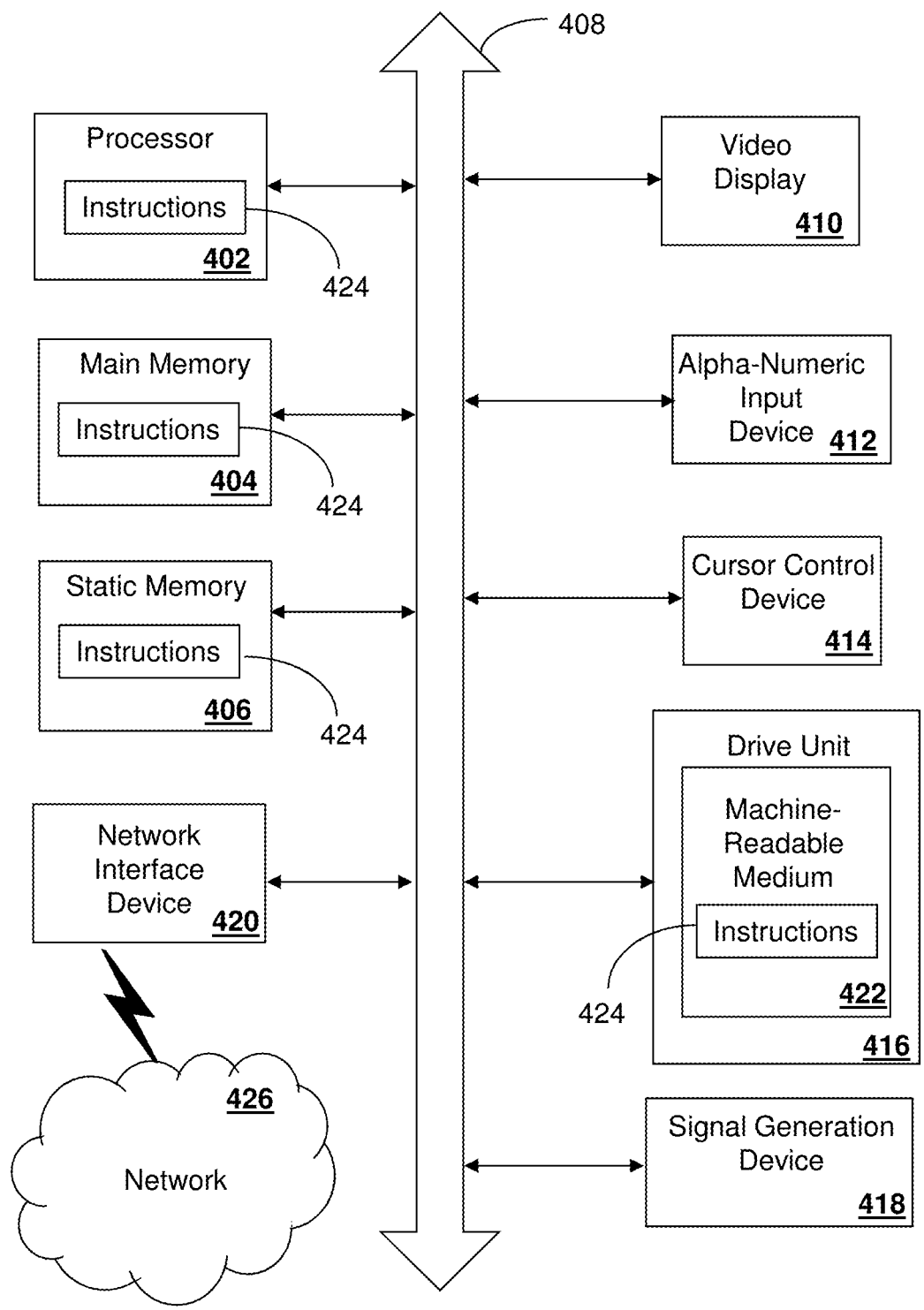
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a processing system comprising a processor,
a request to transfer data stored in a first removable identity module coupled to a first communication device to a second removable identity module coupled to a second communication device, wherein the second communication device is associated with a subscriber having a service plan with a service provider;
retrieving, by the processing system, the data from the first removable identity module by way of a communication link between the first communication device and the processing system;
identifying, by the processing system, transferable portions of the data;
providing, by the processing system, a list of the transferable portions to one of the first communication device and second communication device;
receiving, by the processing system, a user selection for a first portion of the data and a second portion of the data to transfer, wherein the first portion of the data and the second portion of data are one of the transferable portions of the data; and
transferring, by the processing system, the first portion of the data without the second portion of the data to the second removable identity module by way of the communication link responsive to determining that the second removable identity module has a right to store the first portion of the data and does not have a right to store the second portion of the data according to the service plan.

2. The method of claim 1, wherein the data comprises one of a contact book entry, a calendar entry, a still picture, a ringtone, or a combination thereof.

3. The method of claim 1, wherein the receiving of the request to transfer the data comprises receiving, by the processing system, the request from the first communication device, and wherein the method further comprises:
receiving, by the processing system, an identity of the subscriber of the data;
identifying, by the processing system, the service plan associated with the service provider according to the identity of the subscriber; and
wherein the determining that the second removable identity module has the right to store the first portion of the data further comprises verifying, by the processing system, that the subscriber has the right to store the first portion of the data according to a subscriber account.

4. The method of claim 1, further comprising disabling, by the processing system, the first removable identity module responsive to the transferring of the first portion of the data.

5. The method of claim 1, further comprising converting, by the processing system, the first portion of the data from a first format of the first removable identity module and the first communication device to a second format of the second removable identity module.

6. The method of claim 1, further comprising directing, by the processing system, removal of the first portion of the data from the first removable identity module and the first communication device without disabling the first removable identity module and without disabling the first communication device.

7. The method of claim 1, wherein the second communication device is within a vehicle communication system.

8. A device, comprising:
a processing system including a processor; and
a memory that stores executable instructions that, when executed by the processing system, facilitate performance of operations, comprising:
storing data in a first identity module removably coupled to a donor communication device;

requesting a transfer of the data to a second identity module coupled to a recipient communication device, wherein the recipient communication device is associated with a subscriber having a service plan with a service provider;

establishing a communication channel with an intermediary device in response to the requesting of the transfer;

identifying transferable portions of the data;

providing a list of the transferable portions to the intermediary device;

receiving a user selection for a first portion of the data and a second portion of the data to transfer, wherein the first portion of the data and the second portion of data are one of the transferable portions of the data; and providing the first portion of the data and the second portion of the data in the first identity module to the intermediary device by way of the communication channel, wherein the intermediary device provides the first portion of the data without the second portion of the data to the second identity module responsive to a determination that the recipient communication device has a right to the first portion of the data without having a right to the second portion of the data according to the service plan.

9. The device of claim 8, wherein the operations further comprise transmitting an identifier to the intermediary device, and wherein the intermediary device provides the data to the second identity module responsive to validating the recipient communication device according to the identifier.

10. The device of claim 8, wherein the determination that the recipient communication device has the right to the first portion of the data further comprises transmitting to the intermediary device an identifier associated with the subscriber of the donor communication device, causing the intermediary device to determine whether the subscriber has possession rights to the first portion of the data according to the identifier and to transmit the data to the recipient communication device responsive to determining that the subscriber has possession rights to the first portion of the data.

11. The device of claim 8, wherein the operations further comprise:
transmitting to the intermediary device a request to transfer the data to third identity module; and
transmitting the data to the intermediary device, wherein the intermediary device provides the data to the second identity module responsive to a determination that the subscriber associated with the second identity module has possession rights to the data.

12. The device of claim 8, wherein the operations further comprise transmitting to the intermediary device an acknowledgment indicating that the data has been received successfully.

13. The device of claim 8, wherein the donor communication device is also the recipient communication device.

14. The device of claim 9, wherein the operations further comprise providing the identifier to the intermediary device, causing the intermediary device to validate the recipient communication device by associating the identifier with the recipient communication device.

15. A machine-readable storage device comprising executable instructions that, when executed by a processing system including a processor, facilitate performance of operations comprising:
storing data in a first removable identity module coupled to a donor communication device;
identifying transferable portions of the data;
providing a list of the transferable portions to one of the donor communication device and a recipient communication device;
receiving a user selection for a first portion of the data and a second portion of the data to transfer, wherein the first portion of the data and the second portion of the data are one of the transferable portions of the data; and
providing the first portion of the data and the second portion of the data in the first removable identity module to a server, wherein the server provides the first portion of the data without the second portion of the data to a second removable storage module coupled to the recipient communication device, wherein the recipient communication device is associated with a subscriber having a service plan with a service provider, responsive to a determination that the recipient communication device has a right to the first portion of the data and does not have a right to the second portion of the data according to the service plan.

16. The machine-readable storage device of claim 15, wherein the operations further comprise transmitting an identifier to the server, and wherein the server transmits the data to the recipient communication device responsive to validating the recipient communication device according to the identifier.

17. The machine-readable storage device of claim 15, wherein the operations further comprise transmitting to the server an identifier associated with the subscriber of the donor communication device, causing the server to determine whether the subscriber has possession rights to the first portion of the data according to the identifier, and to transmit the first portion of the data to the recipient communication device responsive to determining that the subscriber has possession rights to the first portion of the data.

18. The machine-readable storage device of claim 15, wherein the operations further comprise:
transmitting to the server a request to transfer the data to a third identity module coupled to another recipient communication device;
transmitting the data to the server; and
disabling the first removable identity module responsive to the transmitting the data to the server.

19. The machine-readable storage device of claim 15, wherein the operations further comprise transmitting to the server an acknowledgment indicating that the data has been received successfully.

20. The machine-readable storage device of claim 16, further comprising providing the identifier to the server, causing the server to validate the recipient communication device by associating the identifier with the recipient communication device.

* * * * *